Oct. 13, 1964 W. N. JONES ETAL 3,153,205

CAPACITY CONTROLLED START-STOP OSCILLATOR

Filed Nov. 14, 1960

WITNESSES

INVENTORS
Wesley N. Jones and
Ernst R. Pemsel
BY
ATTORNEY 3,153,205
CAPACITY CONTROLLED START-STOP OSCILLATOR Wesley N. Jones, Severna Park, and Ernst R. Pemsel, Ellicott City, Md., assignors to Westinghouse Electric Corporation, East Pittsburgh, Pa., a corporation of Pennsylvania Filed Nov. 14, 1960, Ser. No. 69,088
3 Claims. (Cl. 331—115)

This invention relates to improvements in capacity controlled oscillators employing molecular engineering concepts and suitable for at least partially monolithic construction, and more particularly to a transistor oscillator which can be turned on or off by varying the capacity, for example, the capacity at control points, for further example, by touching contacts connected to control points. This type of oscillator is commonly referred to in the art as a start-stop oscillator.

In summary, the invention includes an emitter follower semiconductor device, preferably in a Darlington connection, with a capacitive load, which may be external, or which may be the internal capacity of the semiconductor device. The emitter follower is connected in a circuit to form an oscillator, utilizing the negative input impedance of the emitter follower, and in one embodiment a change in capacity at one point in the circuit will cause the circuit to break into oscillation, whereas a change in capacity at another point in the circuit will cause the circuit to stop oscillation. In another embodiment, collector voltage changes change the junction capacity of the transistor.

Accordingly, a primary object of the invention is to provide a new and improved capacity controlled oscillator.

Another object is to provide a new and improved oscillator which may be turned on and off by changes in capacity at one or more points in the circuit.

A further object is to provide a new and improved touch controlled semiconductor oscillator which may be made at least partially in monolithic form.

Figure 1:
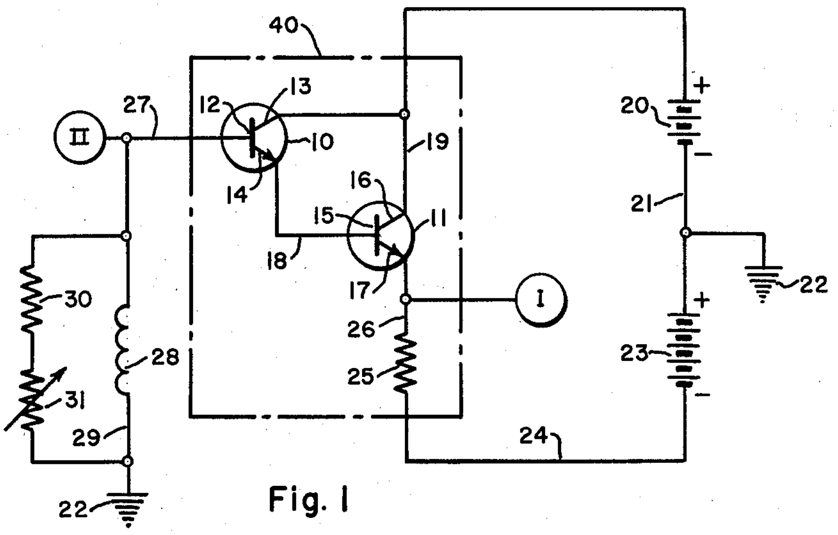
Figure 2:
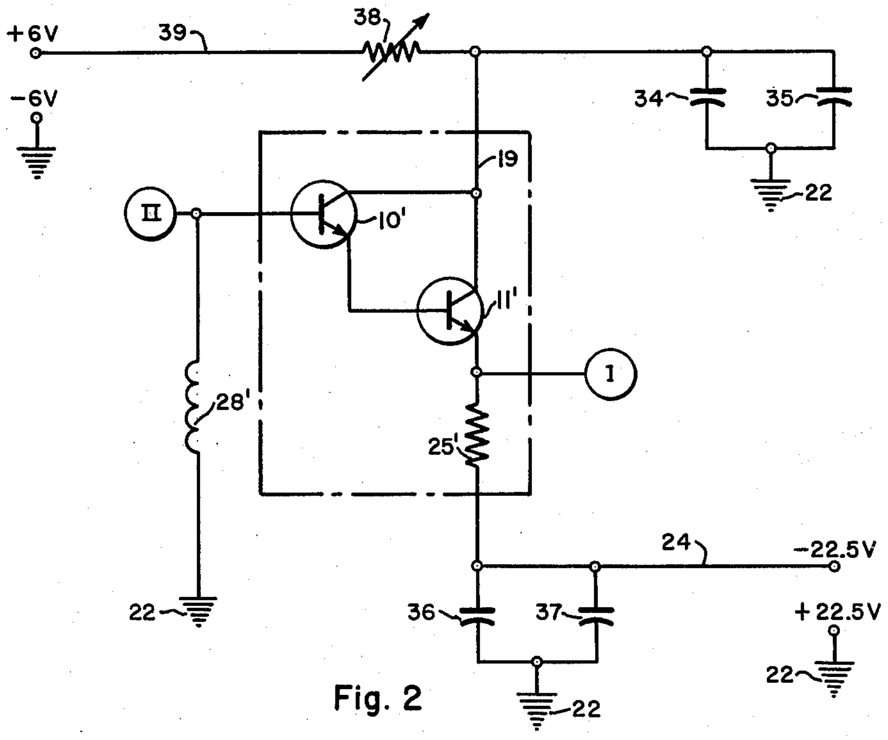

These and other objects will become more clearly apparent after a study of the following specification, when read in connection with the accompanying drawings, in which:

FIG. 1 is a schematic electrical circuit diagram of the preferred embodiment of the invention; and FIG. 2 is a schematic electrical circuit diagram of a second embodiment of the invention.

In the circuit diagram of FIG. 1 at 10 and 11 there are shown two generally designated transistors, transistor 10 having a base 12, collector 13 and emitter 14 and transistor 11 having a base 15, collector 16 and emitter 17. The base 15 of transistor 11 is connected by way of lead 18 to the emitter 14 of transistor 10. The collector 13 of transistor 10 is connected by way of lead 19 to the collector 16 of transistor 11, and lead 19 is also connected to the positive terminal of a suitable source of direct current potential 20 having the negative terminal connected by lead 21 to ground 22. Connected to lead 21 is the positive terminal of an additional source of potential 23 which has the negative terminal thereof connected by lead 24, resistor 25 and lead 26 to the aforementioned emitter 17 of transistor 11. Lead 26 is also connected to contact I which is adapted to be touched to control the oscillator in a manner which will be more fully set forth hereinafter.

The aforementioned base 12 of transistor 10 is connected by lead 27 to a second contact II which is adapted to be touched to control the operation of the oscillator, as will become more clearly apparent hereinafter. Lead 27 is connected by way of inductor 28 and lead 29 to ground 22, and inductor 28 has connected in parallel therewith the series-connected resistor 30 and rheostat 31.

Whereas the transistors 10 and 11 and resistor 25 are shown separately and enclosed in dashed outline 40, it will be understood that in accordance with the teachings of Darlington Patent No. 2,663,806 the transistors separately designated 10 and 11 may be portions of one semiconductor device, or in accordance with molecular engineering techniques the two transistors and the resistor 25 may form regions or portions of a semiconductor block, the various leads being formed by rendering portions of the semiconductor block highly conductive. Contacts I and II could be areas on the surface of the block.

In the apparatus of FIG. 1, and solely by way of example, the inductor 28 may have a value of 470 microhenries. The combined resistance of 30 and 31 may be in the order of one-half megohm. Transistors 10 and 11 may be of a type known in the trade as 2W338. Resistor 25 may have a value of 22 kilohms. Battery 20 may supply a potential of 6 volts. Battery 23 may supply a potential of 22.5 volts, to provide an oscillator having a frequency of approximately 1.5 megacycles per second.

An examination of the circuit of FIG. 1 reveals that it resembles a Colpitts oscillator, of the general type in which internal feedback through the transistor is employed. General discussions of triode transistors in Colpitts oscillator circuits occur in the literature of the art; for example, reference may be had to works entitled "Transistor Circuit Engineering," edited by Richard F. Shea, John Wiley & Sons, Inc., 1957, pp. 226–228; and "Transistor Electronics," by Lo et al., Prentice Hall, Inc., 1955, pp. 378–381.

The oscillator circuit of the instant invention depends for its operation upon the negative input impedance of an emitter follower connected transistor. Negative input impedance oscillators have been generally discussed in the literature of the art; reference may be had to the above-mentioned works including Lo et al., pp. 357–366, and to a work entitled "Transistor Electronics," by De Witt and Rossoff, McGraw-Hill Book Company, Inc., 1957, pp. 228–233 and pp. 262–264. Reference may be had to a letter entitled "Stabilities of Common Emitter and Emitter Follower Transistor Amplifiers," Proceedings of the I.R.E., September 1959, pp. 1657–1658; to an article entitled "Negative Impedance Converters," by A. I. Larky, I.R.E. Transactions on Circuit Theory, September 1957, pp.124–131; and "Handbook of Semiconductor Electronics," by Hunter, McGraw-Hill Book Company, Inc., 1956, pp. 15–34 to 15–38. A further discussion of a Darlington Compound Transistor Connection occurs in the I.R.E. Transactions on Circuit Theory, September 1957, pp. 291–292. Reference may be had to the tables on pages 117–121 of the aforementioned work by Lo et al.

Following through the equations appearing in one or more of the above-referenced works will reveal that an emitter follower transistor may, under certain conditions, have a negative input impedance over a portion of its characteristic curve, and this negative input impedance is used in the circuit or apparatus of the instant invention in the generation of oscillations.

In the operation of the circuit, it will be seen that the use of the Darlington connection increases the internal circuit capacity so that an external capacitor is not needed in the output circuit. The input impedance of the circuit appears as a negative resistance paralleled by a capacity. In order to provide an oscillatory circuit, the inductor 28 is inserted in the circuit in parallel with the transistor capacity. The tuning elements are the input capacity of the circuit and the inductance of inductor 28. Resistance, including the fixed resistor 30 and variable resistor 31, is shunted across the tuned circuit to adjust the quality factor Q of the circuit to a value which provides the desired marginal stability. Resistor 31 is adjusted to a value whereat if the terminal I is touched with a finger, the capacity in the output circuit will increase, the increase being "reflected back" to the input in predetermined phase relationship producing in effect a greater negative impedance at the input. This causes the circuit to break into oscillation. The damping resistor 31 may be adjusted also to a value whereat the circuit will continue to oscillate when the finger is removed from terminal I. Touching the terminal II will increase the capacity at this point and reduce the negative input impedance and stop the oscillation. The value of resistor 31 can be adjusted, and the invention so intends, that the oscillation will not restart when the finger is removed from terminal II. Accordingly, it is possible to adjust the value of resistor 31 so that the oscillations may be started or stopped by touching contacts I or II, and the circuit will remain in that condition after the finger is removed.

Resistor 31 may also be adjusted so that oscillation will stop when contact II is touched or approached, but the oscillations will restart when the finger is removed from contact II. Conversely, it is possible to adjust resistor 31 so that oscillation requires that point or contact I be continuously touched, the circuit going out of oscillation when the finger is removed from contact I.

As will be readily understood, the circuit is basically controlled by an increase in capacity at points I and II, and the invention includes the use of any suitable means for causing capacity increases at these points. The invention lends itself readily to control of a machine tool or a process where a limit switch or reversing switch is needed which does not depend on physical contact.

Particular reference is made now to FIG. 2 in which a second embodiment of the invention is shown. Variation in collector voltage on lead 19 by varying the value of resistor 38 connected by lead 39 to the positive terminal of a suitable direct current source of collector potential may serve two purposes: (1) It may be used in place of resistor 31 of FIG. 1 to adjust the operating point to a position whereat touching electrodes I and II varies the capacity between critical limits causing the circuit to start and stop oscillating; (2) after the value of collector voltage is adjusted to a value approaching the critical value, a further small variation in the voltage on lead 19 may be employed to itself cause the circuit to start and stop the generation of oscillations. The junction capacity of a junction transistor varies as a function of the voltage applied to the junction. Variations in junction capacity and accordingly transistor internal capacity as a result of voltage variations may control the generation of oscillations in a manner similar to touching control electrodes I and II.

Capacitors 34 and 35 may be dispensed with if desired, or may be employed to by-pass radio frequencies and isolate the oscillator from a distantly located power source. Similarly, capacitors 36 and 37 may be dispensed with, or may be employed if desired for similar purposes.

The embodiment of FIG. 2 may generate a signal of approximately 11.25 megacycles frequency where the following components and component values are employed:

| | | |
|---|---|---|
| 10' | | 2N338 |
| 11' | | 2N338 |
| 28' | microhenries | 19.6 |
| 25' | kilohms | 2.4 |
| 34 | microfarads | 30.0 |
| 35 | do | .001 |
| 36 | do | .001 |
| 37 | do | 12.0 |

As previously stated, the invention contemplates monolithic construction of all of the elements included in the dashed line 40. As previously stated, contacts I and II might also be regions on the surface of the monolithic block, as will be readily understood.

It will be understood that coils 28 and 28' should be designed to have a minimum Q, for example, 44. If the coil Q is too low, the input circuit has a positive resistance and the circuit will not oscillate.

Whereas the invention has been shown and described with respect to some embodiments thereof which give satisfactory results, it should be understood that changes may be made and equivalents substituted without departing from the spirit and scope of the invention.

We claim as our invention:

1. A touch controlled oscillator comprising, in combination, circuit means including a first transistor having a base, collector and emitter, a second transistor having a base, collector and emitter, both the collectors being connected together, the emitter of the first transistor being connected to the base of the second transistor, a source of potential connecting said collectors to a common circuit point, an additional source of potential and a resistor connecting the emitter of the second transistor to said common circuit point, a first contact connected to said last-named emitter, a second contact connected to the base of the first transistor, an inductor connecting said last-named base and second contact to said common circuit point, and variable resistor means connected in parallel with said inductor, said first and second transistors being connected as an emitter follower, said emitter follower having a negative input impedance, said inductor and the internal capacitance of the transistors being effectively in parallel forming a resonant circuit, the Q of the resonant circuit being adjustable by adjusting the value of the variable resistor means, said variable resistor means being normally adjusted to a value whereat the negative input impedance is insufficient to cause the circuit to go into oscillation, touching said first contact increasing the capacity at said first contact, said increase in capacity being reflected through the first and second transistors to the resonant circuit thereby increasing the negative input impedance to a value which causes the circuit to go into oscillation, touching the second contact connected to the base of the first transistor changing the capacity at said point and reducing the negative input impedance to a value whereat the circuit goes out of oscillation.

2. A start-stop oscillator comprising circuit means including a first transistor having a base, collector and an emitter, a second transistor having a base, collector and an emitter, both of said collectors being connected together, the emitter of the first transistor being connected to the base of the second transistor, a source of potential connecting said collectors to a common circuit point, an additional source of potential and a resistor connecting the emitter of the second transistor to said common circuit point, means for applying capacitance between said last-named emitter and said common point, second means for applying capacitance between the base of said first transistor and said common circuit point, inductive reactance means connected between said last-named base and said common circuit point, variable resistor means operatively connected with said inductive reactance means, said first and second transistors being connected as emitter followers, said emitter-followers having a negative input impedance, said inductive reactance means and the internal capacitance of said transistors forming a resonant circuit, said variable resistor means being normally adjusted to a value whereat the negative input impedance is insufficient to cause the circuit to go into oscillation, whereby an increase in the capacitance between said emitter of said second transistor and said common circuit point is reflected through said transistors to said resonant circuit thereby increasing the negative impedance to a value which causes the circuit to go into oscillation, and whereby an increase in the capacitance between the base of said first transistor and said common point reduces the input impedance to a value at which said circuit goes out of oscillation.

3. A start-stop oscillator comprising circuit means including a first transistor and a second transistor, each of said transistors having a base, a collector and an emitter, both of the collectors of said transistors being connected together, the emitter of said first transistor being connected to the base of the second transistor, a source of potential connecting said collectors to a common circuit point, an additional source of potential and a resistor connecting the emitter of said second transistor to said common circuit point, means for changing the capacitance between the emitter of said second transistor and said common circuit point, means for changing the capacitance between the base of said first transistor and said common circuit point, inductive reactance means connected between said last-named base and said common circuit point, said first and second transistors being connected as emitter followers, said inductive reactance means and the internal capacitance of said transistors forming a resonant circuit, means for adjusting the positive resistance of said resonant circuit with respect to the negative impedance reflected into the input circuit of said first transistor which includes said inductive reactance means, said relative adjustment between positive and negative resistance normally being such that the negative impedance is insufficient to cause the circuit to go into oscillation and is adjacent the oscillation condition in the negative operating region so that an increase in capacitance between the emitter of said second transistor and said common circuit point causes the circuit to go into oscillation and whereat an increase in the capacitance between the base of said first transistor and said common circuit point reduces the negative input impedance to a value where said circuit goes out of oscillation.

References Cited in the file of this patent

UNITED STATES PATENTS

| | | |
|---|---|---|
| 2,280,605 | Roberts | Apr. 21, 1942 |
| 2,682,037 | Bobis et al. | June 22, 1954 |
| 2,820,145 | Wolfendale | Jan. 14, 1958 |